United States Patent [19]

Labüs

[11] 4,294,115

[45] Oct. 13, 1981

[54] MEASURING DEVICE FOR PRACTICALLY SIMULTANEOUS ΔT AND T MEASUREMENT

[75] Inventor: Herwig Labüs, Jülich, Fed. Rep. of Germany

[73] Assignee: Kernforschungsanlage Jülich Gesellschaft mit beschränkter Haftung, Jülich, Fed. Rep. of Germany

[21] Appl. No.: 130,849

[22] Filed: Mar. 17, 1980

[30] Foreign Application Priority Data

Mar. 17, 1979 [DE] Fed. Rep. of Germany ....... 2910608

[51] Int. Cl.³ .............................................. G01K 7/16
[52] U.S. Cl. ................................. 73/342; 73/362 AR
[58] Field of Search ............ 73/342, 362 AR; 331/66

[56] References Cited

U.S. PATENT DOCUMENTS 2,976,729 3/1961 Smith ..................................... 73/342
3,950,991 4/1976 Grass ..................................... 73/342

Primary Examiner—Donald O. Woodiel
Attorney, Agent, or Firm—Becker & Becker, Inc.

[57] ABSTRACT

A measuring device, for practically simultaneous measurement of a temperature difference and an absolute temperature, with temperature precision resistors for the temperatures. Both temperature precision resistors, along with a reference resistor, are arranged in parallel, with time switches provided in the current supply lines thereof, with the aid of which these resistors are sequentially supplied from a common constant power source with equal current pulses during predetermined time intervals. Condensers or capacitors are provided in parallel to the individual resistors and are sequentially charged, with the aid of a time window switching during time intervals lying within the current pulse time intervals over sense lines and differential switches to the pulse voltages which fall at the resistors. By switches for the transfer of the voltage differences between the capacitors, and within a subsequent time interval, to capacitors grounded on one side, there are obtained voltage values which are a measure of the temperature differential. A zero adjustment of the differential time output may be provided by applying a small fixed correction current to one precision resistor, and an adjustable small correction current to the other precision resistor.

3 Claims, 2 Drawing Figures

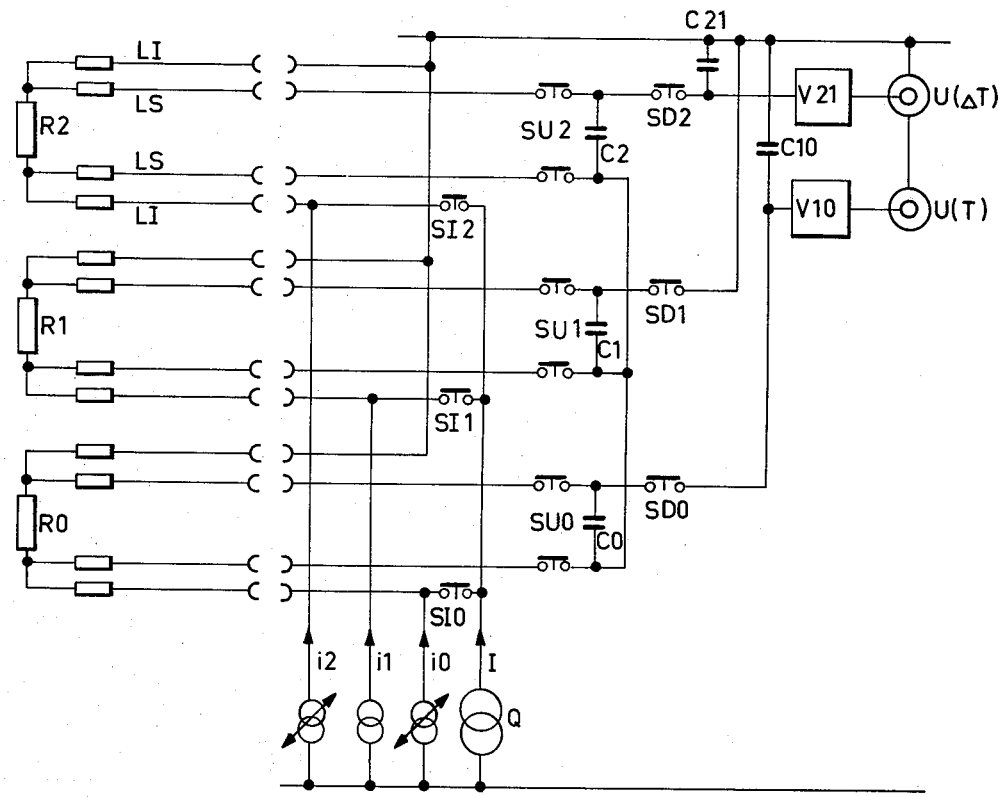
FIG.1
FIG.2
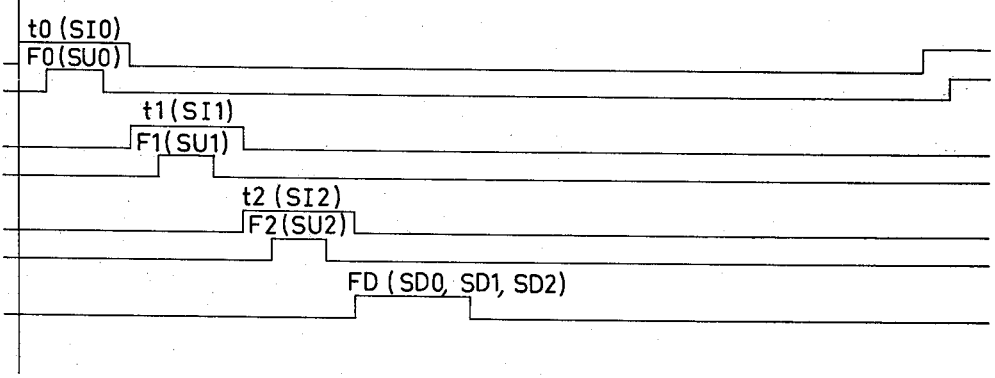

MEASURING DEVICE FOR PRACTICALLY SIMULTANEOUS ΔT AND T MEASUREMENT

The present invention relates to a measuring device for the practically simultaneous measurement of a temperature difference $T_2 - T_1$ and an absolute temperature $T_1$, with temperature measuring or precision resistors R1 and R2 for the temperatures $T_1$ and $T_2$.

A frequently occurring measuring problem of the temperature measuring technology comprises having to measure a small temperature difference ΔT (1° C.<ΔT<10° C.) between two measuring points with an accuracy of a few percent, i.e. in the lower measuring region with a resolution of a few hundredths degree, and simultaneously having to measure the absolute temperature T (−20° C. <T<100° C.) of one of the two measuring points with a nominal resolution (<1° C.). With such measurements, subsequently abbreviated ΔT, T measurement, no linearizing of the measuring range or width is necessary as a consequence of the restricted temperature range and the moderate accuracy requirements. ΔT, T measurements are carried out in a great number in the solar technology on psychrometers in connection with the efficiency measurement of heat collectors, heat exchangers, and the like.

Industrially, resistance thermometers are offered (for instance Fluke 2180A), with which the absolute temperatures can be accurately measured to 0.02° C. by utilizing temperature measuring resistors which have especially close tolerances (≦0.01%) and are accordingly expensive. With two such devices, and a third device for the differential formation of both absolute measurements, the ΔT, T measurement can be carried out. The instrumentation, however, requires much space and is very costly.

It is therefore an object of the present invention to develop a compact and moderately-priced ΔT, T measuring device with which the simultaneous ΔT and T measurement can also be carried out with temperature-measuring resistors having less close tolerances (≦0.1%), and preferably with a high resolution (≦0.02° C.) of the ΔT measurement.

This object, and other objects and advantages of the present invention, will appear more clearly from the following specification in connection with the accompanying drawing, in which:

FIG. 1 shows a circuit diagram for the schematically illustrated measuring arrangement of the present invention; and FIG. 2 graphically illustrates the closing times of the switches of FIG. 1.

The measuring device of the present invention is characterized primarily by a parallel arrangement of both temperature-precision resistors R1, R2, along with a reference resistor R0 of preferably 100 Ω, in the current-supply lines LI of which time switches SI1, SI2, SI0 are provided, with the aid of which the resistors R1, R2, R0 have power successively applied thereto from a common constant power source Q with equal current pulses I during the time intervals t1, t2, t0; condensers or capacitors C1, C2, C0 are respectively provided in parallel to the individual resistors R1, R2, R0, and are sequentially charged, with the aid of a time window or gate switch during time intervals F0, F1, and F2 lying within the current pulse time intervals t1, t2, t0, over "sense" lines LS and differential switches SU1, SU2, SU0 to the pulse voltages U1, U2 and U0 which fall or decrease at the resistors R1, R2, R0; and switches SD1, SD2 and SD0 are provided for the transfer of the voltage differences (U2-U1) and (U1-U0) between the capacitors C2 and C1 and C1 and C0 within a subsequent time interval FD to capacitors C21 and C10, which are grounded on one side, and the particular voltage values of which are a measure for $T_2 - T_1$ and $T_1$.

The voltages to the capacitors C21 and C10 can, for example, be analog post-amplified and/or digitalized with analog-digital converters or transducers.

The measuring device may be further characterized by a zero adjustment of the ΔT-output when the precision resistors R1 and R2 exist at a suitable but exactly equal temperature, such adjustment being accomplished by a small fixedly set correction current i1, which is approximately two orders of magnitude smaller than the current I, for application upon the precision resistor R1, and by a small yet adjustable correction current i2, which lies between zero and i1, for application upon the precision resistor R. The reference resistor R0 may, like the precision resistors R1 and R2, be connected at the front plate in four-conductor technique.

Referring now to the drawing in detail, equal current pulses I from a common constant power source Q are successively applied to two temperature measuring or precision resistors R1, R2, and one 100 Ω reference resistor R0, over current supply lines LI and current switches SI1, SI2, SI0 during the times t1, t2, t0. In this connection, in the time windows or gates F1, F2, F0, which open or close after beginning and before ending of each current pulse, the condensers or capacitors C1, C2, C0 are respectively charged over "sense" lines LS and differential switches SU1, SU2, SU0 to the pulse voltages U1, U2, U0 which fall or decrease at the resistors R1, R2, R0. In a fourth time window or gate FD adjoining the last current pulse, the voltage differences (U2−U1) and (U1−U0) between the capacitors C2 and C1, and C1 and C0, are transferred with the switches SD1, SD2, SD0 to capacitors C21 and C10, which are grounded on one side; the voltage differences are then post-amplified with the amplifiers V21 and V10.

With this measuring arrangement, the following advantages are realized:

(1) no zero-point drifting as a consequence of differing current drifts of individual current supplies of the measuring and reference resistors, since a single power source supplies all resistors equally;

(2) higher sensitivity of the measuring resistors, since the pulsed currents with the same self-warming can be considerably higher than continuous currents;

(3) high in-phase rejection of the voltage drops at the supply line resistors by charging of the condensers C1, C2, C0 over "sense" lines LS and differential switches SD1, SD2, SD0, accompanied by avoiding the difficulties usually encountered in conventional switching or circuits by having to carry out, with differential amplifiers, a reaction-free offset voltage compensation and in-phase rejection compensation;

(4) very accurate ΔT determination without detour by way of two error=burdened absolute measurements by direct determination or evaluation of the voltage difference (U2−U1) between the two measuring resistors R1, R2 at the input with the switches SD1, SD2, whereby the difficulties with differential amplifiers mentioned in item (3) above are likewise avoided;

(5) simple zero-point shifting of the T measurement only by changing the reference resistance R0, since the T measurement occurs by the same principle as the ΔT measurement; and (6) no damaging influence of switching time differences and transient behavior or response by capacitor charging or charge reversal during the "time window" or gates F1, F2, F0, FD.

The aforementioned advantages bring about that the simultaneous ΔT, T measurement can be carried out with a compact and moderately priced device. In order now, with such a simple device, to attain a high resolution of the ΔT measurement also with measuring resistors not having very close tolerances (<0.1%), a small, fixedly set correction current i1 (i1~I×10$^{-2}$) should be applied to the measuring resistor R1, and a small but adjustable correction current i2 (0<i2<i1) should be applied to the measuring resistor R2, whereby i2 is so adjusted that the ΔT-output indicates zero when both measuring resistors R1, R2 are at a suitable but exactly identical temperature.

With this method there is achieved in a simple manner that in spite of different absolute values of the measuring resistors R1, R2 at 0° C., the zero point of the ΔT measurement is maintained at all absolute temperatures T, as shown by the following reasoning:

The voltages U1(T), U2(T) at the measuring resistors R1, R2 are set forth as a function of the absolute temperature T, and the currents (I+i1) and (I+i2) respectively flowing therethrough, as follows:

$$U1(T) = (I+i1) \times R1(0) \times (1 + \int_0^T \alpha(T)dT) \quad 1.$$

$$U2(T) = (I+i2) \times R2(0) \times (1 + \int_0^T \alpha(T)dT) \quad 2.$$

In the foregoing equations, R1(0), R2(0) are somewhat different resistances, as conditioned by tolerances, for the primary element at T=0° C., and (α) is the temperature-dependent temperature coefficient which, however, is the same with both primary elements.

The requirement U1(T)≡U2(T) is fulfilled according to the equations 1 and 2 on the basis of equation 3 as follows:

$$i2 = I \times (R1(0)/R2(0) - 1) - i1 \times R1(0)/R2(0) \quad 3.$$

Equation 3 is independent of T, which means that the zero point of the ΔT measurement is likewise independent of T. The selection of two unipolar correction currents i1 and i2 for the "balancing" or "symmetrization" of the primary elements was decided upon since the utilization of only one, yet bipolar, correction current is technically more complex.

An advantageous embodiment of the device comprises having the reference resistor R0 as well as the measuring resistors R1, R2 connected in 4-conductor technique at the front plate. This permits, for instance, a quick switching of the zero point of the T measurement with shiftable resistance decades. In place of the stable reference resistor, there can also be connected a third PT-100 resistor, which is thermostatized to 0° C. for absolute measurements, or with which a second differential measurement can be carried out.

The present invention is, of course, in no way restricted to the specific disclosure of the specification and drawing, but also encompasses any modifications within the scope of the appended claims.

What I claim is:

1. A measuring device, for the practically simultaneous measurement of a temperature difference and an absolute temperature, comprising:

two temperature precision resistors for the two temperatures, and a reference resistor, one of said precision resistors being associated with said absolute temperature, and said resistors being connected in parallel;

a common constant power source;

current supply lines respectively connected with said resistors and said power source;

time switches respectively provided in said current supply lines and with the aid of which power can be successively applied to said resistors from said power source with equal current pulses during specified time intervals;

three capacitors respectively provided in parallel to said resistors;

sense lines and differential switches respectively connected with said resistors and capacitors, said capacitors being sequentially chargeable, with the aid of a time window switching during time intervals lying within said current pulse time intervals, over said sense lines and said differential switches, to the pulse voltages which fall at said resistors; and switches for the transfer, within a subsequent time interval, to a fourth capacitor, of the voltage difference between the other precision resistor and said precision resistor associated with said absolute temperature, and to a fifth capacitor, of the voltage difference between said precision resistor associated with said absolute temperature and said reference resistor, said fourth and fifth capacitors being grounded on one side, and said voltage values being a measure for said temperature difference and said absolute temperature.

2. A measuring device according to claim 1, which includes a zero adjustment of the temperature difference output when said precision resistors are at any exactly equal temperature, said adjustment including means for applying to said precision resistor associated with said absolute temperature a small fixed correction current which is approximately two orders of magnitude smaller than said current pulses, and for applying to said other precision resistor a small yet adjustable correction current which is between 0 and said fixed correction current.

3. A measuring device according to claim 1, which includes a front plate, said resistors being connected thereto in 4-conductor technique.

* * * * *